June 25, 1963

G. C. PRICE 3,095,471

AERIAL CABLE SUPPORT SPACER

Filed April 20, 1961

INVENTORS
George C. Price
BY Connolly and Hutz
ATTORNEYS

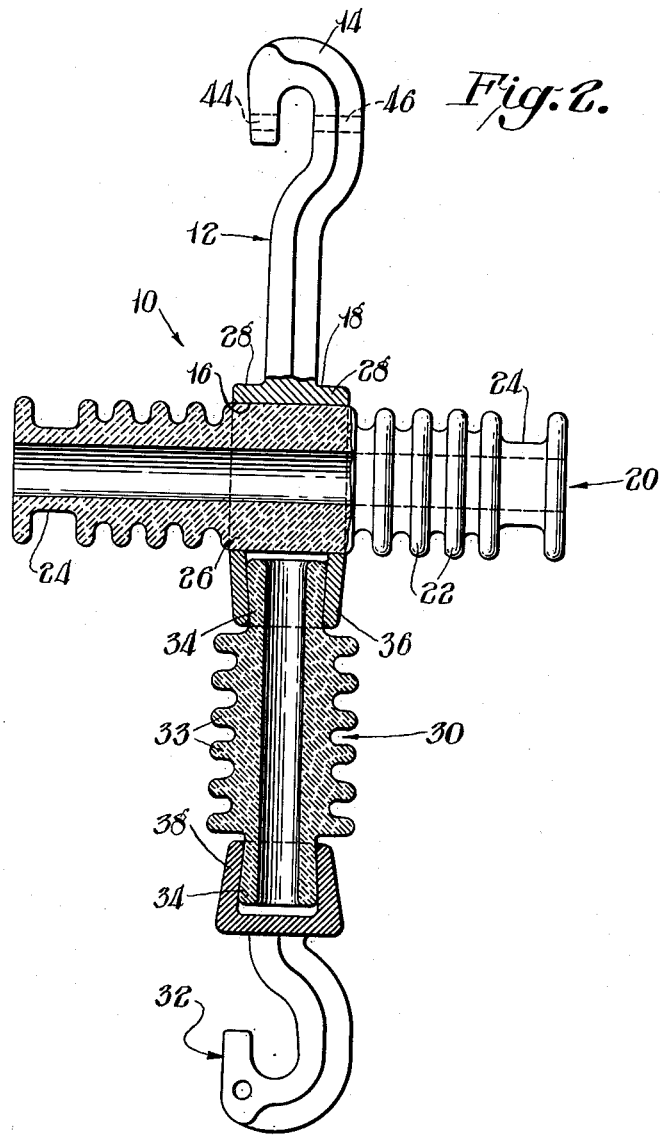

June 25, 1963 G. C. PRICE 3,095,471
AERIAL CABLE SUPPORT SPACER
Filed April 20, 1961 3 Sheets-Sheet 3
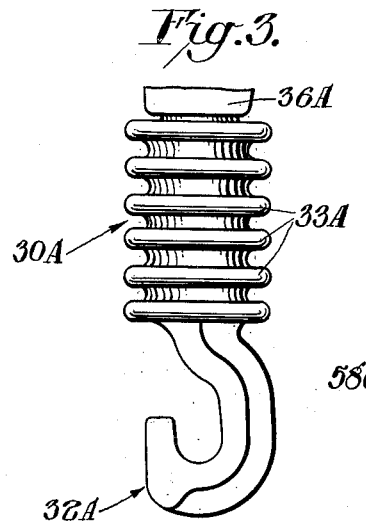
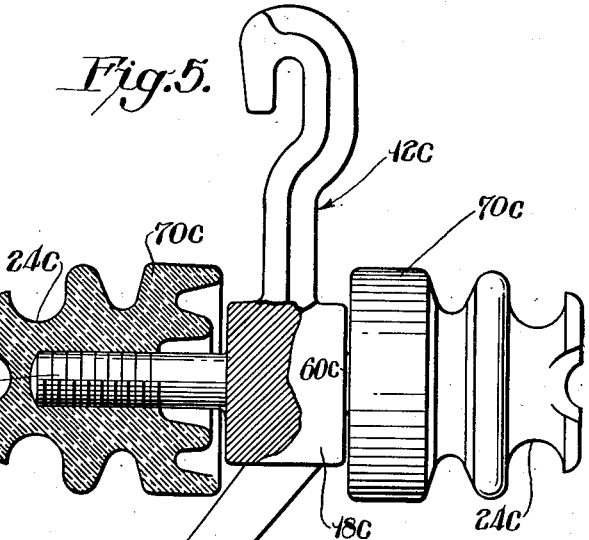
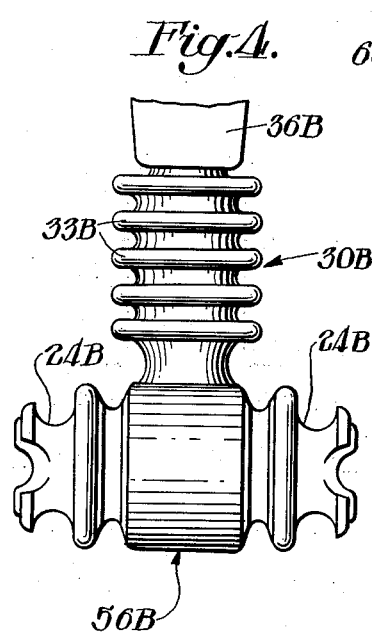
INVENTORS
George C. Price
BY Connolly and Hutz
ATTORNEYS

United States Patent Office 3,095,471
Patented June 25, 1963

3,095,471
AERIAL CABLE SUPPORT SPACER
George C. Price, Battle Creek Township, Calhoun County, Mich., assignor to Oliver Electrical Manufacturing Company, Battle Creek, Mich., a corporation of Delaware
Filed Apr. 20, 1961, Ser. No. 104,391
11 Claims. (Cl. 174—160)

This invention relates to a device for supporting electrical cables from a messenger wire in a spaced relationship, and it more particularly relates to such a device which can be used with uninsulated or thinly-insulated electrical cables or wires.

Many aerial cable supports and spacers are now made from plastics such as methyl methacrylate and other acrylic types of plastics. Although these plastics do not conduct electricity, they tend to track in outdoor service and eventually flash over if they are used to support bare electrical conductors even when spaced from them by rubber grommets. This is particularly true for fairly high voltage overhead primary electrical distribution lines ranging approximately from 7200 volts to 15,000 volts and over. It is also troublesome and expensive to stock the aforementioned grommets or bushings in the wide range of sizes required for engaging the large number of electrical cable sizes being used, and available plastics are not as strong and dependable for outdoor service as might be desired.

An object of this invention is to provide a durable outdoor aerial cable support and spacer which can be used with bare or thinly insulated electrical conductors; and Another object is to provide such a support and spacer that will not break down physically or electrically in outdoor service extending over many decades.

In accordance with this invention cable supporting elements made of a vitrified insulating material, such as porcelain or glass are attached to opposite sides of a hanger element made of a strong structural material such as metal, which is hooked upon a messenger line. Electrical cables which may be completely uninsulated are inserted within grooved sections upon the insulating supporting elements which space them upon sides of the hanger element. The vitrified insulating material, such as porcelain, is an excellent electrical insulator with essentially unlimited life in outdoor service, and a hanger element made of a light and strong metal such as aluminum provides sufficient structural strength. Another similar cable supporting element may be connected to the bottom of the hanger element for supporting another cable. Both the laterally extending insulating elements and the vertical one may be made in the form of tubular rods or spools to minimize weight. These rods may be connected to bosses upon the hanger or screwed on to arms extending outwardly from the hanger. The electrical wires or cables are secured to the grooved portions of the insulating elements by any convenient means such as tie wires, and the hook of the hanger element can be secured about the messenger wire by a cotter key or tie wire. This device thereby combines the physical strength, formability and durability of a strong structural material such as metal with the excellent electrical insulating properties of a vitrified insulating material such as glass, porcelain or various ceramic materials.

Novel features and advantages of the present invention will become apparent to one skilled in the art from a reading of the following description in conjunction with the accompanying drawings wherein similar reference characters refer to similar parts and in which:

FIG. 2 is a cross-sectional view in elevation taken through the embodiment shown in FIG. 1;

FIGS. 3 and 4 are front views in elevation of modifications of the lower portions of the embodiment shown in FIGS. 1 and 2; and, FIG. 5 is a front view in elevation of another embodiment of this invention.

Figure 1:
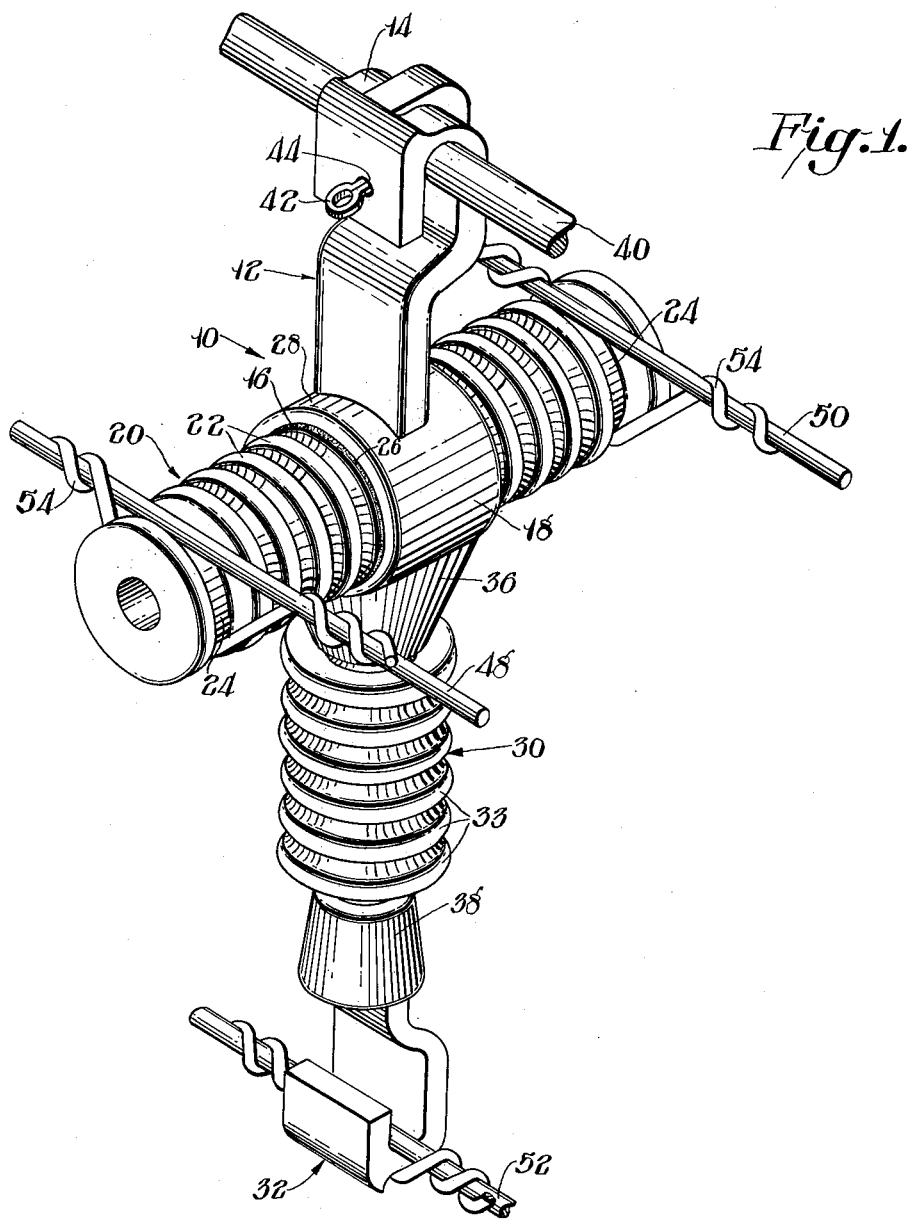
FIG. 1 is a perspective view of one embodiment of this invention.

In FIGS. 1 and 2 is shown an aerial cable support and spacer 10 including a hanger element 12 having a hook 14 extending from its upper portion and a bore 16 formed through its lower section 18. A porcelain rod 20 is inserted and secured within bore 16 and extends from opposite sides of lower section 18 in a substantially horizontal orientation.

Hanger element 12 is, for example, made of a light strong metal such as aluminum, and rod 20 is made of electrical insulating porcelain for example of the wet process type. The outer surface of this porcelain is glazed with the portions secured to other materials being sanded to provide a secure grip upon them. Porcelain rod 20 is, for example, made cylindrical in form and preferably tubular to minimize its weight. It includes a series of peripheral ridges 22 for improving its insulating properties, and a pair of grooved sections 24 are provided upon its ends, which are spaced from the sides of the lower section, for retaining electrical cables inserted within them as shown in FIG. 1.

The center section 26 of rod 20 is cylindrical in form, and its surface is sanded or otherwise roughened for secure engagement within bore 16 of center section 18 of hanger element 12. The tubular ends 28 of lower section 18 are also intimately deformed or swedged about center section 26 in securely hold rod 20 within center section 18. Center section 18 may also be secured to rod 20 by cementing with resin or other adhesive agents, such as Portland cement.

Another porcelain rod 30 is connected to the bottom of hanger element 12, and a cable supporting projection formed by a lower hook 32 extends from the bottom of vertical porcelain rod 30 for supporting another electrical cable upon supporting spacer 10. Lower porcelain rod 30 is also for example conveniently made tubular in form and includes peripheral ridges 33 similar to ridges 22 of rod 20.

Rod 30 is conveniently connected to the bottom of hanger 12 and the top of hook 32 by forming its ends with outwardly tapered sections 34 and inserting them with bosses 36 and 38 respectively of hanger 12 and hook 32. Bosses 36 and 38 are intimately formed or swedged about tapered ends 34 to securely engage them.

As shown in FIG. 1 aerial supported spacer 10 is conveniently secured to messenger wire 40 by engaging hook 14 over it, and inserting a cotter pin 42 through holes 44 and 46 (as shown in FIG. 2) and spreading its ends to secure it.

Uninsulated electrical cables 48, 50 and 52 are inserted within grooves 24 in horizontal porcelain rods 20 and lower hook 32 and secured to these elements for example by conventional tie wires 54. Such a device may therefore be conveniently installed and assembled in the field and will provide adequate strength with almost unlimited life in outdoor service without breakdown unless abused or maliciously damaged. There are no special parts such as grommets or bushings necessary for use with various sizes of cable, and almost any size of either insulated or uninsulated cable can be supported from this device although it is particularly convenient for use with uninsulated electrical cable which may carry voltages as high as 15,000 volts and even higher as found in commonly used overhead primary electrical lines. These devices are for example hung from the top messenger or neutral strand of wire at a spacing of approximately 30 feet from each other, and the indicated spacing of the supported conductors will accordingly be maintained under all conditions of sway and whipping encountered during wind and sleet conditions.

In FIG. 3 is shown a modified lower rod 30A which includes an integral hooked end 32A. Lower rod 30A is entirely made of a vitrified insulating material such as glass; and when it is made of a relatively high tensile strength glass, such as Pyrex, dispenses with the separate hook element 32 shown in FIG. 2.

In FIG. 4 the lower insulating rod 30B includes a pair of lower sections 56B providing a pair of grooved sections 24B, which may both be utilized for supporting cables. However only one cable may be supported upon it by utilizing only one grooved section 24B. Insulating cable supporting element 30B is made of an insulating ceramic material of the vitrified type. The expression vitrified insulating material refers to glass and glassy materials such as glass, porcelain, pottery and other ceramic materials that provide excellent insulating properties, but are not structurally strong enough to be used to form hanger element 12.

In FIG. 5 is shown another form of this invention in which hanger element 12C includes a hub 18C from which three arms 58C, 60C and 62C extend. Arms 58C and 60C extend laterally to opposite sides of hub 18C, and arm 62C extends substantially vertically downwardly from hub 18C. Arm 62C accordingly includes a downwardly inclined leg 64C and a vertical transition section 66C to which is attached the horizontal extremity 68C which forms the end of arm 62C.

Spools 70C made of a suitable vitrified insulating material such as porcelain or glass are attached to arms 58C, 60C and 62C, for example, by being screwed upon them. Cables (not shown) are supported upon spools 70C by inserting them within grooves 24C in the manner previously described and securing them to spools 70C, for example, by the previously described tie wires.

What is claimed is:

1. An aerial cable support and spacer comprising a hanger element having an upper portion and a lower section, a hook extending from an upper portion of said hanger element for attaching it to a messenger line, said lower section of said hanger element being formed to include a bore which extends through opposite sides of said hanger element, a porcelain rod inserted within said bore and extending from opposite sides of said lower section, grooved sections being formed upon the ends of said rod spaced from both sides of said lower section for retaining electrical cables which are inserted within them, a boss extending from the bottom of said hanger element, a second porcelain rod being provided, the upper end of said second porcelain rod being outwardly tapered, said outwardly tapered end being inserted within said boss, said boss being deformed about said outwardly tapered end to secure it to said lower section of said hanger element, a lower hook element, and said lower hook element being attached to the lower end of said second porcelain rod.

2. An aerial cable support and spacer as set forth in claim 1 wherein said porcelain rods are tubularly formed, and said grooved sections comprise peripheral grooves formed upon the ends of said first mentioned porcelain rod remote from said lower section of said hanger element.

3. An aerial cable support spacer as set forth in claim 2 wherein said lower boss is formed upon the top of said hook element, the lower end of said second porcelain rod being outwardly tapered and inserted within said lower boss, and said lower boss being deformed into intimate contact about said outwardly tapered lower end of said second porcelain rod for attaching it to said lower hook element.

4. An aerial cable support and spacer comprising a hanger element of a relatively strong structural material having an upper portion and a lower section, a hook extending from said upper portion of said hanger element for attaching it to a messenger line, cable supporting elements attached to opposite sides of said hanger element, said cable supporting elements being made of a vitrified insulating material, said lower section of said hanger element being formed to include a bore which passes through opposite sides of said hanger element, a rod of a vitrified insulating material being inserted within said bore and extending from opposite sides of said lower section to form said cable supporting elements, grooved sections being provided upon portions of said rod spaced from both sides of said lower section for retaining electrical cables which are inserted within them, said rod being cylindrically formed, and said grooved sections comprising peripheral grooves formed upon the ends of said rod remote from said lower section of said hanger element.

5. An aerial cable support and spacer as set forth in claim 4 wherein said cylindrical rod is tubular.

6. An aerial cable support and spacer comprising a hanger element of a relatively strong structural material having an upper portion and a lower section, a hook extending from said upper portion of said hanger element for attaching it to a messenger line, cable supporting elements attached to opposite sides of said hanger element, said cable supporting elements being made of a vitrified insulating material, said lower section of said hanger element being formed to include a bore which passes through opposite sides of said lower section, a rod of a vitrified insulating material being inserted within said bore and extending from opposite sides of said lower section to form said cable supporting element, grooved sections being provided upon portions of said rod spaced from both sides of said lower section for retaining electrical cables which are inserted within them, a center section of said rod which is inserted within said bore being roughened, and said lower section being intimately deformed about said center section to secure said center section within it.

7. An aerial cable support and spacer comprising a hanger element of a relatively strong structural material having an upper portion and a lower section, a hook extending from said upper portion of said hanger element for attaching it to a messenger line, cable supporting elements attached to opposite sides of said hanger element, said cable supporting elements being made of a vitrified insulating material, said lower section of said hanger element being formed to include a bore which passes through opposite sides of said hanger element, a rod of vitrified insulating material being inserted within said bore and extending from opposite sides of said lower section to form said cable supporting elements, grooved sections being provided upon portions of said rod spaced from both sides of said lower section for retaining electrical cables which are inserted within them, a second rod of said vitrified insulating material being provided, a connecting means attaching the upper end of said second rod to said lower section of said hanger, and a cable supporting projection extending from the lower end of said second rod for retaining another electrical cable.

8. An aerial cable support and spacer as set forth in claim 7 wherein said second rod is tubular in form.

9. An aerial cable support and spacer as set forth in claim 7 wherein said connecting means comprises a boss extending from the bottom of said hanger element, the upper end of said second rod being outwardly tapered, said outwardly tapered end being inserted within said boss, and said boss being deformed intimately about said outwardly tapered end to secure it to said lower section of said hanger element.

10. An aerial cable support and spacer as set forth in claim 7 wherein said cable-supporting projection comprises a lower hook element, and said lower hook element being attached to the lower end of said second rod.

11. An aerial cable support and spacer as set forth in claim 10 wherein bosses are formed upon the bottom of said hanger element and the top of said lower hook element, both of the ends of said second rod being outwardly tapered and inserted within said bosses, and said bosses being intimately deformed about said outwardly tapered ends for securely attaching said second rod to said hanger element and to said lower hook element.

References Cited in the file of this patent

UNITED STATES PATENTS

| | | |
|---|---|---|
| 309,267 | Weaver | Dec. 16, 1884 |
| 838,163 | Baum | Dec. 11, 1906 |
| 913,419 | Moran | Feb. 23, 1909 |
| 954,596 | Stadermann | Apr. 12, 1910 |
| 1,034,518 | Scheible | Aug. 6, 1912 |
| 1,058,673 | Jervis | Apr. 8, 1913 |
| 1,248,502 | Kyle | Dec. 4, 1917 |
| 1,315,633 | McFeaters | Sept. 9, 1919 |
| 1,813,863 | Nightingale | July 7, 1931 |
| 2,927,147 | Flower | Mar. 1, 1960 |
| 3,021,381 | Wengen | Feb. 13, 1962 |
| 3,021,382 | Horrocks et al. | Feb. 13, 1962 |